United States Patent [19]

Heathe et al.

[11] Patent Number: 4,848,920
[45] Date of Patent: Jul. 18, 1989

[54] STATIC MIXER

[75] Inventors: William R. Heathe, Mississauga; Pierre Pinet, Islington, both of Canada

[73] Assignee: Husky Injection Molding Systems Ltd., Bolton, Canada

[21] Appl. No.: 161,442

[22] Filed: Feb. 26, 1988

[51] Int. Cl.$^4$ .............................................. B01F 5/06
[52] U.S. Cl. ................................................... 366/339
[58] Field of Search ............... 366/336, 337, 338, 339, 366/340, 80, 87, 157, 79, 318; 425/208, 209, 204; 138/40, 42; 48/180.1, 189.4, 189.1

[56] References Cited

U.S. PATENT DOCUMENTS

| | | | |
|---|---|---|---|
| 2,505,355 | 4/1950 | Gliss | 366/340 X |
| 3,051,452 | 8/1962 | Nobel | 366/337 |
| 3,286,992 | 11/1966 | Armeniades et al. | |
| 3,404,869 | 10/1968 | Harder | |
| 3,583,678 | 6/1971 | Harder | |
| 3,664,638 | 5/1972 | Grout et al. | |
| 3,704,006 | 11/1972 | Grout et al. | |
| 3,785,620 | 1/1974 | Huber | |
| 3,871,624 | 3/1975 | Huber et al. | |
| 3,923,288 | 12/1975 | King | 366/336 |
| 3,989,434 | 11/1976 | Mercer | 425/207 |
| 4,201,480 | 5/1980 | Brand | 366/79 |
| 4,541,982 | 9/1985 | Upmeier | 425/208 X |
| 4,614,440 | 9/1986 | King | 366/340 X |

FOREIGN PATENT DOCUMENTS 373356 1/1964 Switzerland ......................... 366/337

OTHER PUBLICATIONS

"Post Extruder Mixing and Thermal Homogenization of Plastic Melt", by S. J. Chen and W. E. Segl, date unknown.
"Ross Motionless Mixers", by Ross Engineering Inc., date unknown.
"Koch Melt Blender", by Koch Engineering, 1980 (month unknown).

Primary Examiner—Harvey C. Hornsby
Assistant Examiner—Scott J. Haugland
Attorney, Agent, or Firm—Bachman & LaPointe

[57] ABSTRACT

The present invention relates to a static mixer for generating a substantially homogeneous media stream. The mixer has a series of angularly offset mixing elements with each element comprising a central boss portion, a plurality of ribs extending radially from the boss and defining with the periphery of the boss a plurality of substantially pie-shaped segments through which the media stream flows, and a plurality of webs for dividing each segment into two substantially equal flow areas. Each web has a first edge extending substantially radially and a second edge extending substantially circumferentially and is twisted through approximately 90° from the first edge to the second edge.

14 Claims, 4 Drawing Sheets

STATIC MIXER

BACKGROUND OF THE INVENTION

The present invention relates to the plasticizing and extrusion of thermoplastic resins in injection molding applications and in particular to a static mixer for generating a substantially homogeneous melt stream.

Static mixers have been used for many years as a means of generating a homogeneous melt stream from a screw type resin plasticizer. One early type of mixer is known as the "Kenics" mixer. In this type of mixer, the incoming melt stream is split into two paths. reoriented 90° and discharged into a chamber prior to entering a second stage of splitting and reorientation. A "Kenics"-type mixer is illustrated in the paper "Post Extruder Mixing and Thermal Homogenization of Plastic Melt" by S. J. Chen and in U.S. Pat. Nos. 3,386,992, 3,664,638 and 3,704,006. The primary disadvantage associated with this type of mixer is the considerable length of mixing required in order to obtain a homogeneous mix.

A development arising from the "Kenics" principle is the "Komax" mixer. This type of mixer is characterized by a central boss, six relatively thick radial arms curved to define a plurality of circular passageways, and intermediate curved members for dividing each passageway. The curved members rotate through approximately 180° from a radial direction to a circumferential direction. The primary disadvantages associated with this mixer are the significant pressure drops encountered during use due to the relatively thick, non-uniformly dimensioned radial arms and the melt hang-up and degradation due to the curved surfaces defining the flow passageways.

Still other mixers based on the "Kenics" principle are the Dow/Ross mixer and the Koch mixer. One type of Dow/Ross mixer is an interfacial surface generator mixer similar to those exemplified by U.S. Pat. Nos. 3,404,869 and 3,583,678. As shown in the U.S. Pat. No. 3,404,869 the mixer may consist of a number of tetrahedral, rectangular or circular chambers having two or more inlets and two or more non-coplanar outlets. A plurality of separate passageways, as shown in the U.S. Pat. No. 3,583,678, may be used to connect the inlet and outlet ends with the passageways opening on the inlet end along a first line lying approximately through the center of the inlet end and opening on the outlet end along a second line lying approximately through the center of the outlet end and being essentially normal to the first line.

A second type of Dow/Ross mixer is shown in the brochure "Ross Motionless Mixers" by Ross Engineering Inc. This type of mixer consists of a series of semi-ellipical plates discriminately positioned in a tubular housing. A single element consists of two plates perpendicular to each other. Hereagain, the mixing operation is based on splitting and then diverting input streams.

"Koch"-type mixers are illustrated in U.S. Pat. Nos. 3,785,620 and 3,871,624 as well as in the brochure "Koch Melt Blender" by Koch Engineering Company Inc. The mixing apparatus shown in the U.S. Pat. No. 3,785,620 uses a plurality of packing elements in the flow path for mixing the media together by longitudinal and transverse mixing. Each packing element includes a plurality of lamellas in contact with each other. Each lamella has corrugations thereon with the corrugations of sequentially arranged lamellas being oriented in different directions. In addition, corrugations of at least one of two sequentially arranged lamellas relative to the direction of media flow are disposed at an angle to the axis of the apparatus. Adjacent packing elements abut and are angularly offset to each other about the axis to enhance mixing. The mixing apparatus shown in the U.S. Pat. No. 3,871,624 has a plurality of mixing elements. Each mixing element includes a plurality of layers which contact each other and bound flow channels. The longitudinal axes of the flow channels in each layer extend substantially parallel to one another at least in groups while the longitudinal axes of flow channels in adjacent layers are inclined relative to one another. In a first embodiment, the mixing elements are layers of flat thin plates to which flat thin grid elements disposed at an angle are connected. In another embodiment, each layer in a mixing element comprises a tube bank.

Most static mixers subdivide and recombine the media flow several times during its passage through the mixer. The degree of efficiency with which this is done varies considerably. The main parameters to be considered are pressure drop, amount of mixing, amount of melt hang-up in trapped corners and the cost of producing the mixer. The Dow/Ross type of mixer encounters a large pressure drop during one since the melt passes through relatively small diameter holes. The Koch and Komax type mixers also encounter moderate pressure drops during use but more importantly have many places for the melt to hang-up and degrade. This is because the faces of their mixer elements have significant areas perpendicular to the melt flow. These perpendicular areas create dead spots where the melt can collect and remain stationary for an extended period of time. This causes the melt to degrade. Finally, the Dow/Ross and Komax mixers are very expensive to produce while the Koch mixer tends to collapse under high pressure applications.

Still another type of mixer is illustrated in U.S. Pat. No. 3,989,434. This type of mixer takes the form of a torpedo having a plurality of alternatively isolated and intersecting flow paths for repeatedly dividing and recombining material flow streams. The paths are formed as right and left-hand open helical channels on the circumference of a body with helices of one-hand having a pitch different from that of the other such that flow paths intersect in a pattern which is bilaterally asymmetrical with respect to an axial net flow direction. Torpedo type mixers such as this are used in injection molding machines of the ram feed type where the inherent agitating action of a screw feed is not present.

All the above-noted disadvantages are believed to be successfully overcome by the static mixer of the present invention.

It is an object of the present invention to provide a static mixer having superior mixing efficiency.

It is a further object of the present invention to provide a static mixer as above having relatively low pressure drops associated therewith.

It s still a further object of the present invention to provide a static mixer as above which substantially reduces and virtually eliminates the incidence of melt hang-up and degradation.

It is yet a further object of the present invention to provide a static mixer as above which is relatively compact and inexpensive to manufacture.

These and other objects and advantages will become more apparent from the following description and drawings wherein like reference numerals depict like elements.

SUMMARY OF THE INVENTION

In accordance with the present invention a static mixer for generating a substantially homogeneous media stream has a plurality of angularly offset mixing elements for separating an incoming media stream into a plurality of layers or striations. Each mixing element comprising a central boss, a plurality of relatively thin ribs extending radially from the boss and defining with the periphery of the boss a plurality of substantially pie-shaped segments through which the media stream flows, and means for dividing each segment into two substantially equal flow areas or subsegments to provide improved mixing of the media stream. Each segment dividing means is formed by a web having a first edge extending substantially radially and a second edge extending substantially circumferentially with the second edge being joined at its extremities to two of the ribs. Each rib and web has a substantially constant thickness designed to maximize the flow capacity of each media passageway. Each mixing element is further characterized by a hexagonal aperture in the boss for permitting the element to be mounted on a hexagonally shaped rod.

It has been found that the mixer element of the present invention substantially minimizes the likelihood of media hang-ups and media degradation because its design significantly reduces the presence of surfaces perpendicular to the media flow. In addition, each mixing element is compact, easy to clean, fast to warm up, and relatively inexpensive to manufacture. Still further, the provision of media passageways with a maximized flow area reduces the pressure drop across each element.

DETAILED DESCRIPTION

Figure 1A:
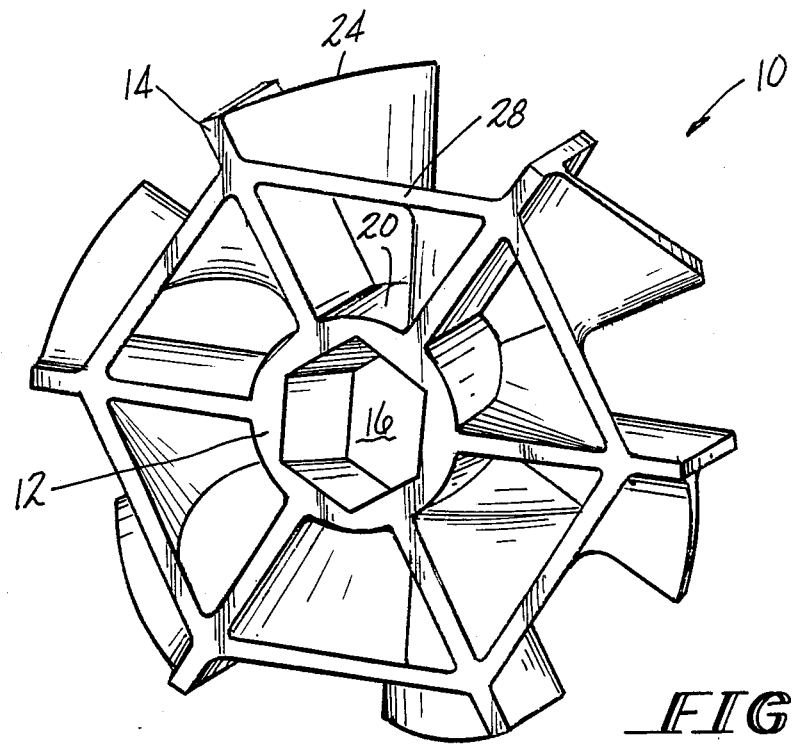
FIGS. 1A and 1B are a back and front view respectively of a first mixing element in accordance with the present invention.
Figure 1B:
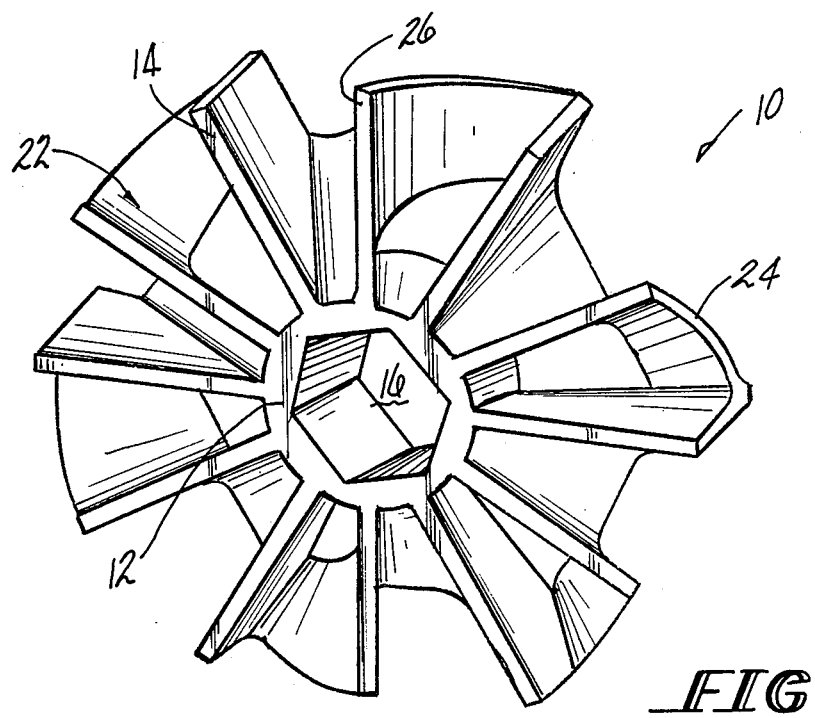

Referring now to FIGS. 1A and 1B, the mixing element 10 has a central boss portion 12 and six substantially planar ribs 14 extending radially from the boss 12. The boss 12 has a central aperture 16 for permitting the mixing element to be mounted on a rod 18. For reasons to be discussed in more detail hereinafter, the aperture 16 has a hexagonal configuration.

The ribs 14 are equally spaced about the periphery of the boss. The length of each rib is determined by the diameter of the bore 34 in the housing, e.g. an extruder barrel, through which the media to be mixed flows and into which the mixer is to be installed. The ribs 14 are further characterized by a substantially constant thickness. In order to minimize and substantially eliminate the possibility of media hang-up and subsequent media degradation or contamination of new media, the ribs 14 are relatively thin and have no curved surfaces.

Adjacent ones of the ribs 14 along with the outer periphery 20 of the boss and the bore 34 in the housing define a plurality of substantially pie-shaped segments 22 through which the media passes. A web 24 located intermediate each pair of ribs 14 divides each segment 22 into two substantially equal mixing areas.

Each web 24 as shown in FIG. 1B has a leading edge 26 which is aligned substantially radially at the upstream side of the mixing element 10. The web 24 twists through approximately 90° of rotation so as to define a trailing edge 28 (see FIG. 1A) which is aligned substantially circumferentially at the downstream side of the element and so as to shorten the length of each mixing element. At the substantially circumferential edge 28, the web 24 is joined to the adjoining ribs 14 to provide a strong construction. Any suitable technique known in the art can be used to join the edge 28 to the ribs 14. As each web 24 extends from its leading edge 26 to its trailing edge 28, its orientation changes substantially uniformly from the substantially radial alignment to the substantially circumferential alignment while maintaining substantially equal areas of section on either side. The design of each web 24 is such that surfaces perpendicular to the media flow are substantially eliminated, thus substantially eliminating the possibility of media hang-up and degradation. Further, each web 24 has a substantially constant, relatively narrow thickness which is designed to maximize the flow area of the media passageway defined by a web 24, a rib 14, the periphery 20 of the boss and the bore 34.

Figure 2A:
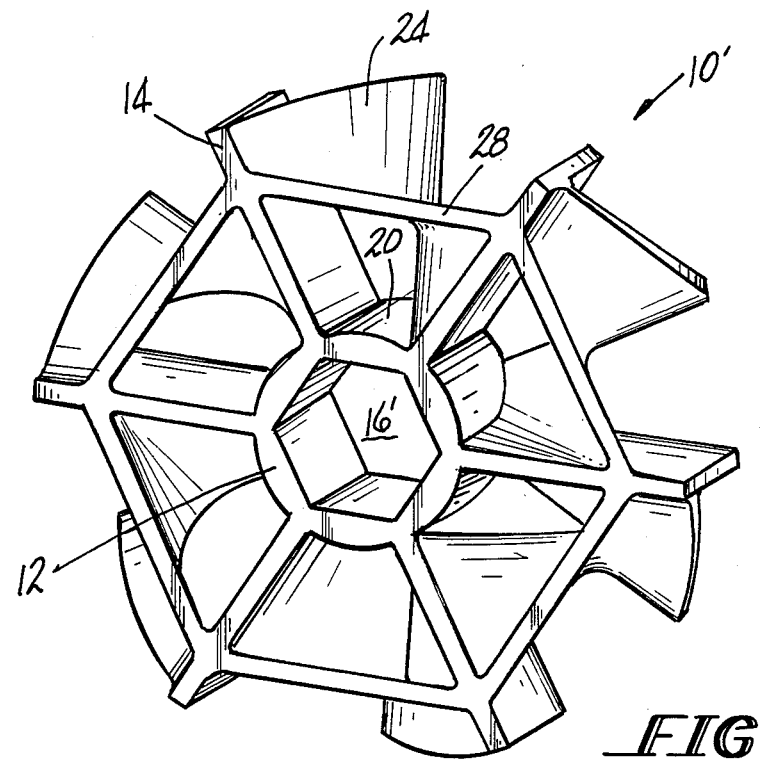
FIGS. 2A and 2B are a back and front view respectively of a second mixing element in accordance with the present invention.
Figure 2B:
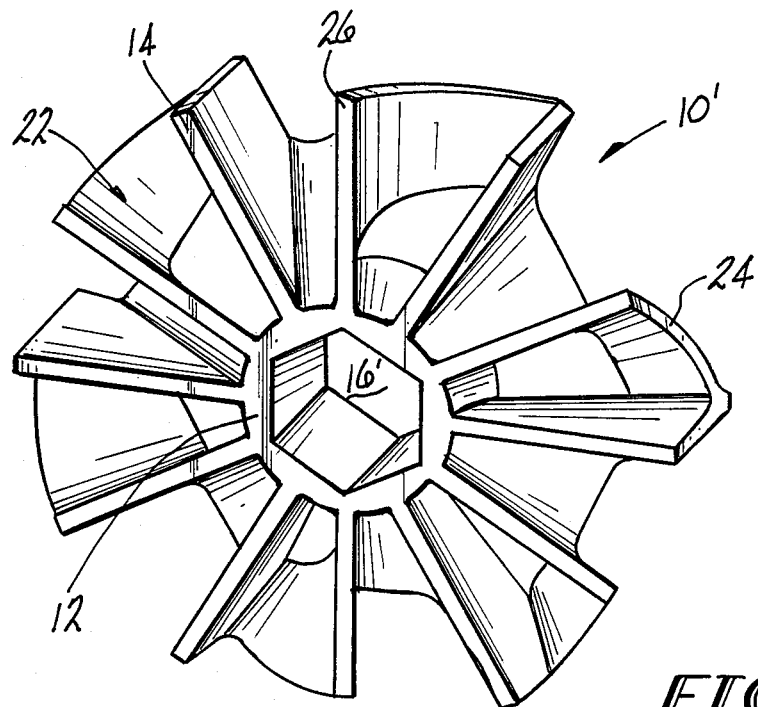

The mixing element 10' shown in FIGS. 2A and 2B is substantially identical to the element 10 shown in FIGS. 1A and 1B with one exception. This exception is the orientation of the central hexagonal aperture 16'. The aperture 16' in the element 10' is angularly offset as compared to the aperture 16 in the element 10 to enable adjacent mixing elements to be angularly offset.

Figure 3:
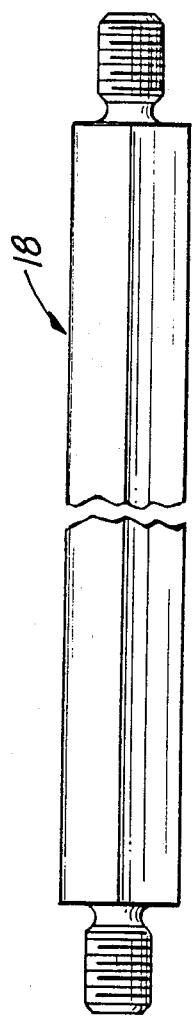
FIG. 3 illustrates a mounting element used in conjunction with the mixing element.
Figure 4:
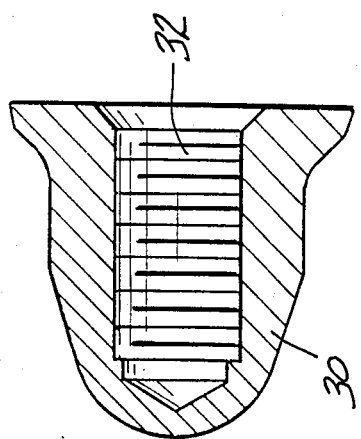
FIG. 4 illustrates a clamping nut used in conjunction with the mixing element.
Figure 5:
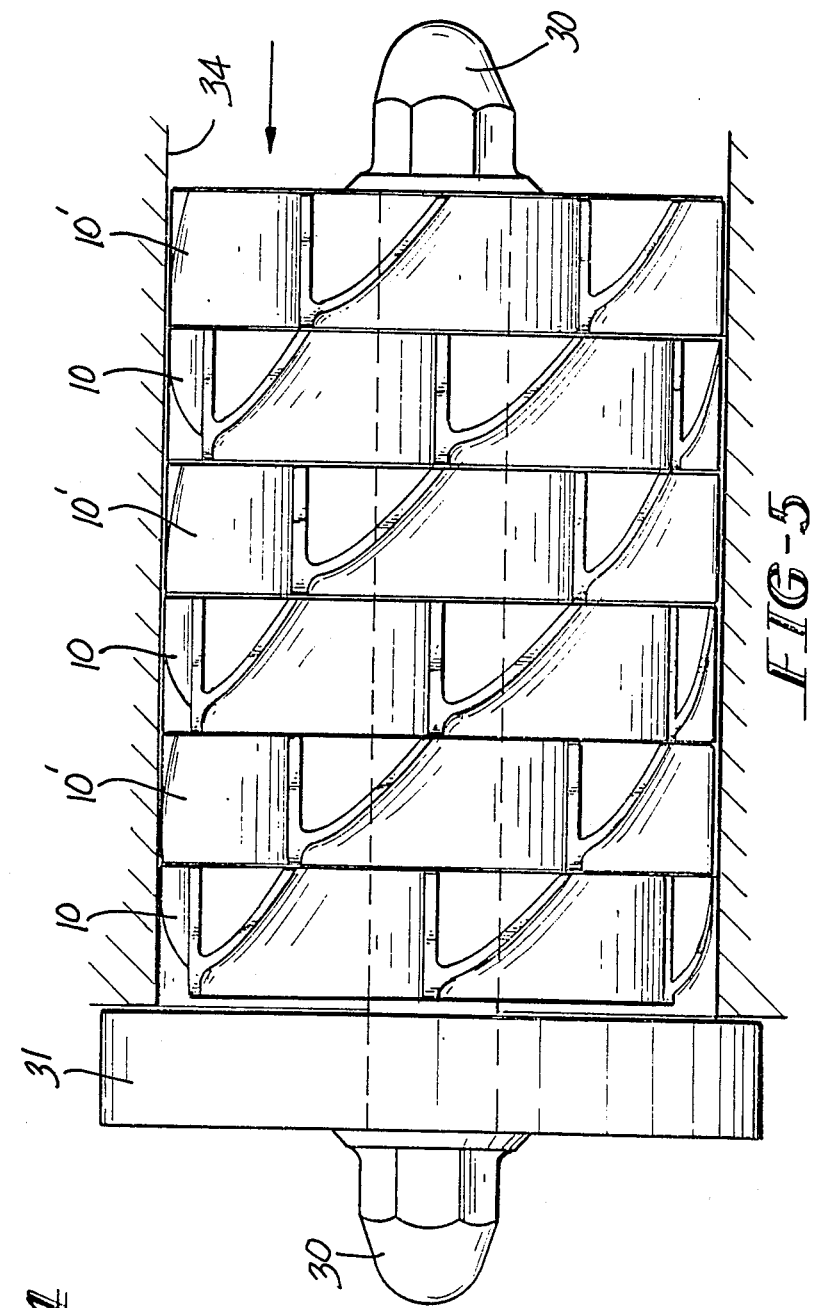
FIG. 5 illustrates a mixer having a plurality of first and second mixing elements in series.

As shown in FIG. 5, a static mixer in accordance with the present invention has a plurality of mixing elements assembled in series. The alternating elements 10 and 10' are assembled in series by sliding them onto a hexagonally shaped rod 18 (see FIG. 3) which passes throught the aperture 16, 16' in the boss 12 of each mixing element. By using a hexagonal shaped rod, the radial alignment of the elements with respect to each other can be controlled by the hexagonal section of the rod. Adjacent mixing elements are angularly offset one half of each element so as to divide the media stream exiting the preceding mixing element. The elements 10 are clamped onto the rod 18 by means of two acorn nuts 30 (see FIG. 4), one at each end of the rod. Each nut 30 has a threaded bore 32 for engaging mating threads on the ends of the rod 18. At the downstream end of the mixer assembly, an element 31 is provided to position and hold the assembly inside the bore 34.

Figure 6:
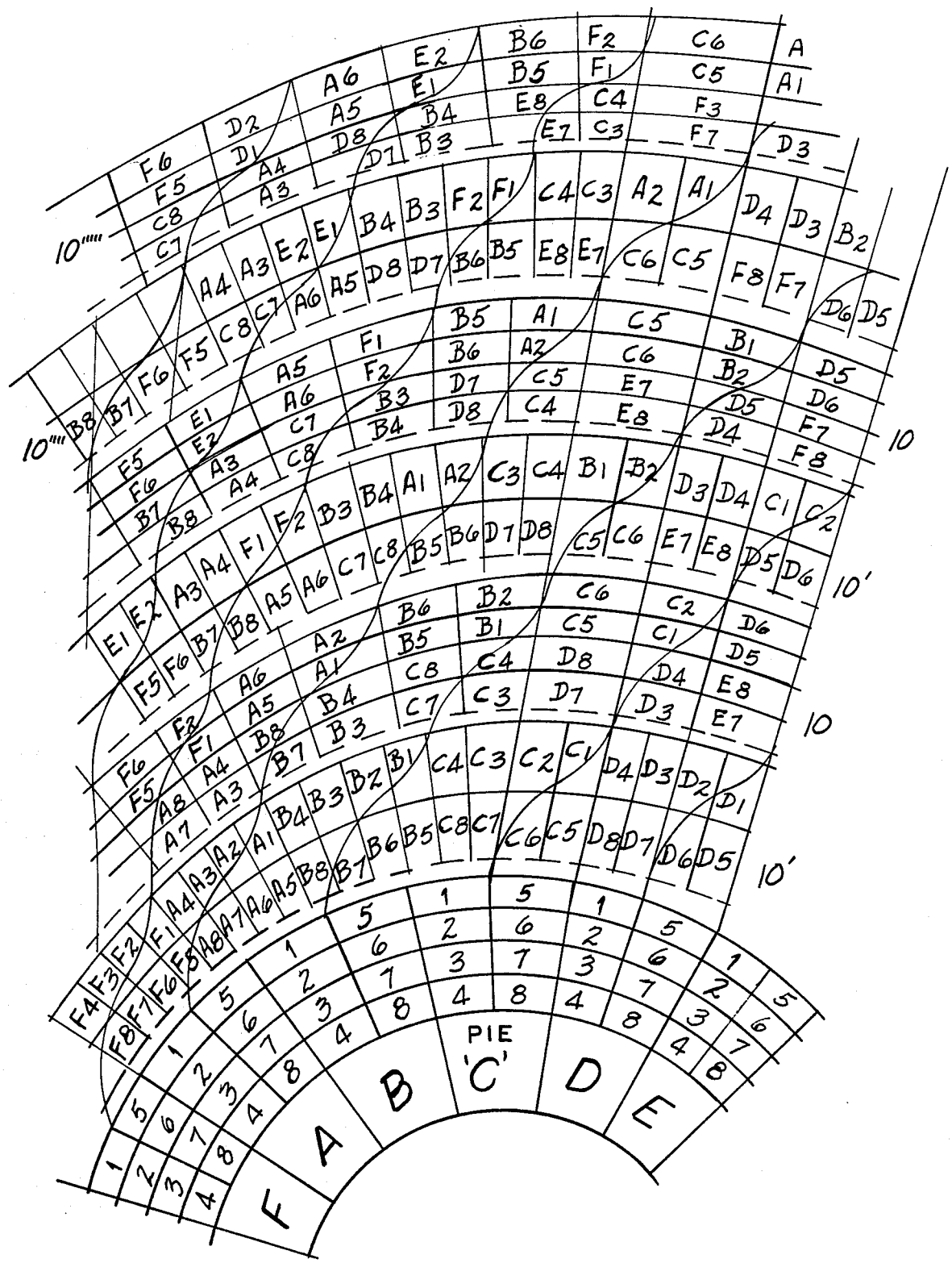
FIG. 6 illustrates the degree of mixing created in a mixer having six elements in accordance with the present invention connected in series.

The static mixer of the present invention provides the advantages of relatively low pressure drop, relatively no dead spots, relatively low cost to manufacture and superior mixing efficiency. The efficiency of mixing is explained in FIG. 6 by considering pie shaped segment "C" of one of the mixing elements in an assembled mixer. The radial ribs 14 mark the sides and the boss surface 20 and the surface of the bore 34 mark the ends of the segment "C". The web 24 radially divides the segment "C" equally. The portion "C" is subdivided into eight subportions respectively numbered 1, 2, 3, 4, 5, 6, 7, 8 so that their passage through the mixing assembly can be traced. If one considers subportion C8 as it passes through the first element 10, it can be seen that it is reoriented from a substantially circumferential alignment to a substantially radial alignment and enters the next element 10' next to the boss 12' and the web 24'. Passing through element 10' causes subportion C8 to be reoriented to a substantially circumferential alignment and leave element 10' next to the web 24' but not next to the boss. Following the passage of subportion C8 through all six mixing elements shows that it is reoriented and divided each time and moves from the boss surface to the rib surface in the third element and to the opposite rib surface in the sixth element. Now consider subportion 1 in segment "A". Subportion A1 moves through the six mixing elements in the opposite direction to subportion C8. They meet each other in the third element.

The number of subdivisions a mixer generates can be computed. The striations generated for a given number of elements can also be calculated. If one were to use a Kenics type mixer having eight elements, 256 striations would be generated. If one used a Komax type of mixer with eight elements, 4.29981 E8 striations would be generated. If one were to use a mixer having eight elements each in accordance with the present invention, 1.8488 E17 striations would be generated. Thus, for a given number of elements, a mixer in accordance with the present invention generates significantly more striations and provides a substantially homogenous melt stream. By simply stacking as many elements as required onto the hexagonal rod, the amount of mixing can be controlled.

Low pressure drops are obtained using the mixing elements of the present invention because each element mixes efficiently and fewer elements are required. In addition, each mixing element is compact, relatively short in length, and has media passageways with a maximized flow area. Further, there are substantially no surfaces obstructing the media flow through the element resulting in low pressure drops.

Low cost to manufacture is achieved because the elements are simple castings with little or no machining formed from any suitable material such as stainless steel. Further, the elements are assembled onto a hexagonal rod with threaded ends.

Other advantages of the present invention are the relative ease of cleaning and the relatively fast warm up which are achieved due to the openness of the mixer element design. Further, there are no moving parts in the element to wear and the overall construction is relatively strong. Finally, the mixer of the present invention achieves true interfacial surface generator action because there are no tunnels.

While it is preferred to form the mixing elements from castings, other materials may be used to form the elements.

While it is preferred to use the mixing elements with the substantially radial edge 26 of the web 24 as the leading edge, it is also possible to use the mixing elements with the substantially radial edge as the trailing edge.

While the static mixer of the present invention may be used to mix a wide variety of media, it has particular utility in the mixing of molten thermoplastic resins.

It is apparent that there has been provided in accordance with this invention a static mixer which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A static mixer for generating a substantially homogeneous media stream which comprises:
   at least one compact mixing element for separating an incoming media stream into a plurality of layers;
   each said mixing element having a central boss and a plurality of substantially planar ribs extending radially from said boss;
   said ribs being spaced substantially equally about the periphery of said boss and defining with the periphery of the boss a plurality of substantially pie-shaped segments through which said media stream flows; and
   means for dividing each said segment into two substantially equal flow areas so as to provide improved mixing of said media stream as it passes through said mixer.

2. A static mixer in accordance with claim 1 which further comprises said dividing means for each said segment being formed by a web having a first edge extending substantially radially from said boss and a second edge extending substantially circumferentially; and
   said second edge being joined at its extremities to two of said ribs.

3. A static mixer in accordance with claim 2 wherein said web is twisted through approximately 90° of rotation from said first edge to said second edge.

4. A static mixer in accordance with claim 3 wherein each said rib and each said web has a substantially constant thickness designed to maximize the flow capacity of each said flow area.

5. A static mixer in accordance with claim 3 wherein each said web changes its orientation substantially uniformly from said first edge to said second edge so as to maintain substantially equal areas of section on opposed sides of the web.

6. A static mixer in accordance with claim 1 which further comprises an aperture in said boss for receiving a mounting element.

7. A static mixer in accordance with claim 6 wherein said aperture is hexagonally shaped and said mounting element is formed by a hexagonally shaped rod.

8. A static mixer in accordance with claim 7 which further comprises:
   a plurality of mixing elements mounted on said rod; and
   adjacent ones of said elements being angularly offset by one half of each element.

9. A static mixer in accordance with claim 8 which further comprises means adjacent each end of said rod for clamping said mixing elements.

10. A compact mixing element for separating a media stream into a plurality of striations which comprises:
    a central boss;
    a plurality of substantially planar ribs extending radially from said boss;
    said ribs being spaced substantially equally about the periphery of the boss and defining with the periphery of the boss a plurality of substantially pie-shaped segments through which said media stream flows; and a plurality of webs for dividing each said segment into substantially equal flow subsegments, each said web being formed by a number twisted through approximately 90° of rotation.

11. A mixing element in accordance with claim 10 wherein each said web has a first edge extending substantially radially from said boss and a second edge extending substantially circumferentially.

12. A mixing element in accordance with claim 11 wherein each said web and each said rib has a substantially constant thickness designed to maximize the capacity of each subsegment.

13. A mixing element in accordance with claim 10 wherein said boss has a hexagonally shaped bore for receiving a mounting element.

14. A mixing element in accordance with claim 10 wherein each rib is relatively thin to maximize the flow capacity of each subsegment and has no curved surfaces on which the media stream can hang-up and degrade.

* * * * *

UNITED STATES PATENT AND TRADEMARK OFFICE
CERTIFICATE OF CORRECTION

PATENT NO. : 4,848,920
DATED : July 18, 1989
INVENTOR(S) : William Heathe et al.

It is certified that error appears in the above-identified patent and that said Letters Patent is hereby corrected as shown below:

In Column 1, line 14, after "paths" change "." to --,--.

In Column 1, line 18, change "3,386,992" to read --3,286,992--.

In Column 2, line 25, change "one" to read --use--.

In Column 2, line 60, change "It s" to read --It is--.

In Column 4, line 44, change "throught" to read --through--.

In Column 7, claim 10, line 5, change "number" to read --member--.

Signed and Sealed this

Twenty-second Day of May, 1990

Attest:

HARRY F. MANBECK, JR.

*Attesting Officer*  *Commissioner of Patents and Trademarks*